United States Patent
Peippo et al.

(10) Patent No.: US 12,110,215 B2
(45) Date of Patent: Oct. 8, 2024

(54) BOX GIRDER, IN PARTICULAR CRANE GIRDER, AND CRANE HEREWITH AS WELL AS MANUFACTURING METHOD THEREFOR

(71) Applicant: Konecranes Global Corporation, Hynvinkää (FI)

(72) Inventors: Juha Peippo, Hyvinkää (FI); Kirsi Kalliokoski, Espoo (FI)

(73) Assignee: Konecranes Global Corporation, Hyvinkää (FI)

( * ) Notice: Subject to any disclaimer, the term of this patent is extended or adjusted under 35 U.S.C. 154(b) by 930 days.

(21) Appl. No.: 17/047,764

(22) PCT Filed: Apr. 17, 2019

(86) PCT No.: PCT/EP2019/060012
§ 371 (c)(1),
(2) Date: Oct. 15, 2020

(87) PCT Pub. No.: WO2019/202043
PCT Pub. Date: Oct. 24, 2019

(65) Prior Publication Data
US 2021/0114845 A1    Apr. 22, 2021

(30) Foreign Application Priority Data
Apr. 18, 2018 (FI) .................. 20185367

(51) Int. Cl.
*B66C 6/00* (2006.01)
*B23K 33/00* (2006.01)
*B23K 101/28* (2006.01)

(52) U.S. Cl.
CPC .............. *B66C 6/00* (2013.01); *B23K 33/00* (2013.01); *B23K 2101/28* (2018.08)

(58) Field of Classification Search
CPC .............. E04C 2003/0413; E04C 3/07; E04C 2003/043; E04C 2003/0465; B66C 6/00; B66C 19/00; B23K 33/00; B23K 2101/28
See application file for complete search history.

(56) References Cited

U.S. PATENT DOCUMENTS

| | | | |
|---|---|---|---|
| 6,895,722 B1 * | 5/2005 | Ponder | E04B 1/3211 52/27 |
| 7,739,854 B2 * | 6/2010 | Yamazaki | B23K 26/38 52/843 |
| 9,540,216 B2 | 1/2017 | Paßmann et al. | |
| 10,130,893 B2 * | 11/2018 | Heston | A63H 33/084 |
| 10,993,532 B1 * | 5/2021 | Goldstein | A47B 47/042 |

FOREIGN PATENT DOCUMENTS

| | | |
|---|---|---|
| DE | 897750 C | 11/1953 |
| DE | 10036366 C2 | 10/2002 |

(Continued)

OTHER PUBLICATIONS

International Search Report of the International Searching Authority from corresponding Patent Cooperation Treaty (PCT) Application No. PCT/EP2019/060012, indicated completed on Jul. 23, 2019.

(Continued)

*Primary Examiner* — Brian E Glessner
*Assistant Examiner* — Daniel J Kenny
(74) *Attorney, Agent, or Firm* — Gardner, Linn, Burkhart & Ondersma LLP

(57) ABSTRACT

A box girder configured as a crane girder has two side plates spaced apart from each other, at least one chord plate connecting the two side plates to each other and at least one transverse plate arranged between the side plates and connecting the side plates to each other, with a welded joint provided between the respective chord plate and the side plates. In order to facilitate the manufacturing process of the box girder, at least one form-fitting connection configured as a plug-in connection is provided between the transverse plate and each of the two side plates. A crane may thus be (Continued)

configured having such a box girder. A corresponding method of manufacturing may also be employed for forming the box girder.

20 Claims, 5 Drawing Sheets

(56) References Cited

FOREIGN PATENT DOCUMENTS

| | | | |
|---|---:|---|---:|
| FR | 1046827 | A | 12/1953 |
| IN | 7458DELNP2014 | A | 4/2015 |
| JP | S49125466 | U | 11/1974 |
| JP | H0218292 | A | 1/1990 |
| JP | 40233090 | A | 2/1990 |
| JP | H11140824 | A | 5/1999 |
| JP | 2015511567 | A | 4/2015 |
| KR | 101289835 | B1 | 7/2013 |
| WO | 2016124773 | A1 | 8/2016 |

OTHER PUBLICATIONS

Written Opinion of the International Searching Authority from corresponding Patent Cooperation Treaty (PCT) Application No. PCT/EP2019/060012, indicated completed on Jul. 23, 2019.
International Preliminary Examination Report from corresponding Patent Cooperation Treaty (PCT) Application No. PCT/EP2019/060012 transmitted Mar. 23, 2020.

\* cited by examiner

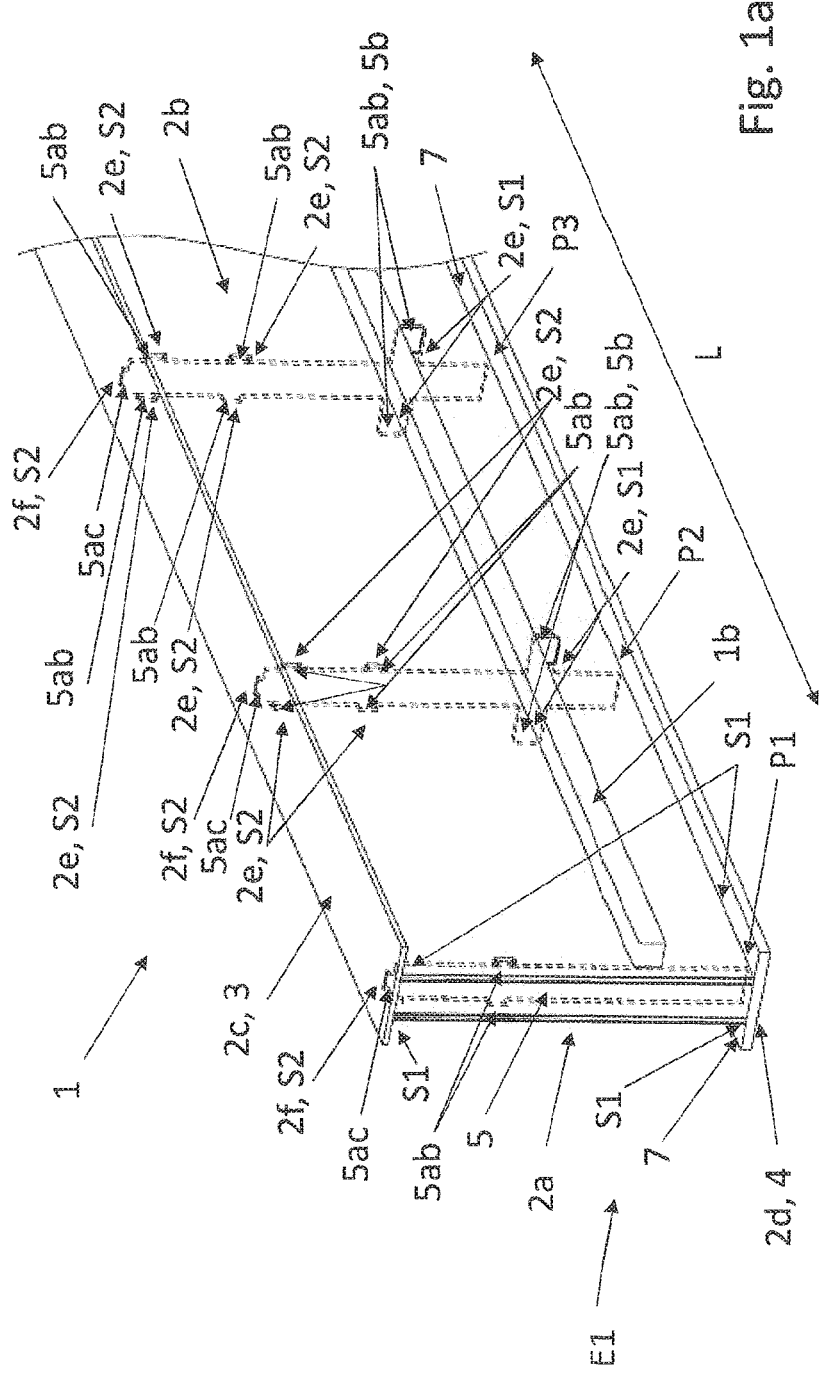

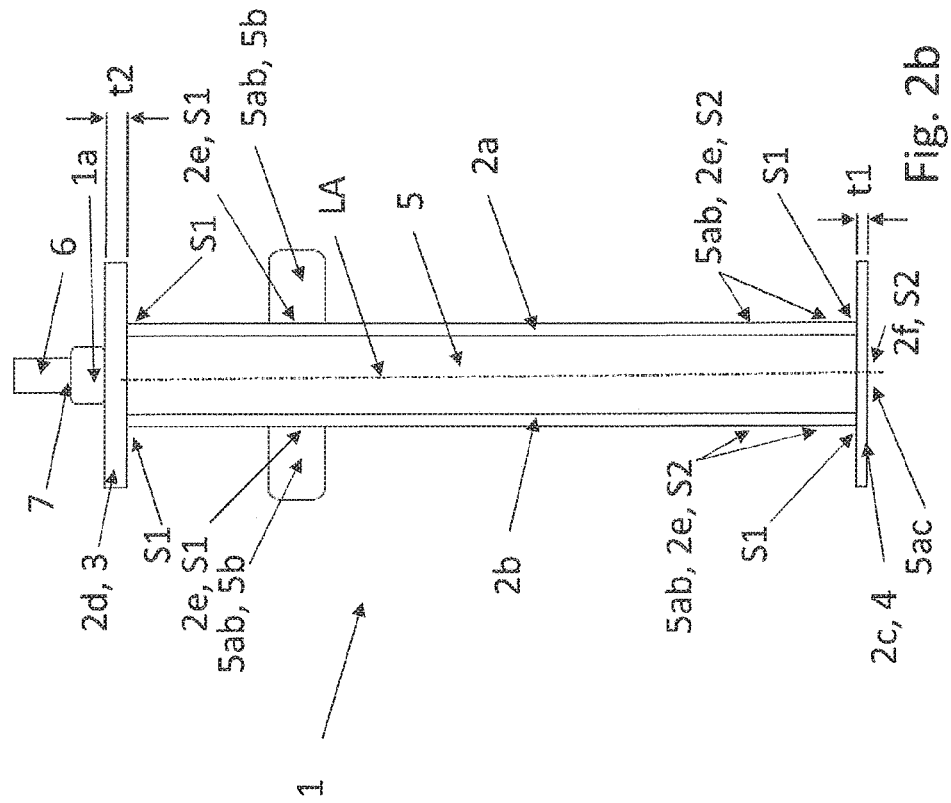
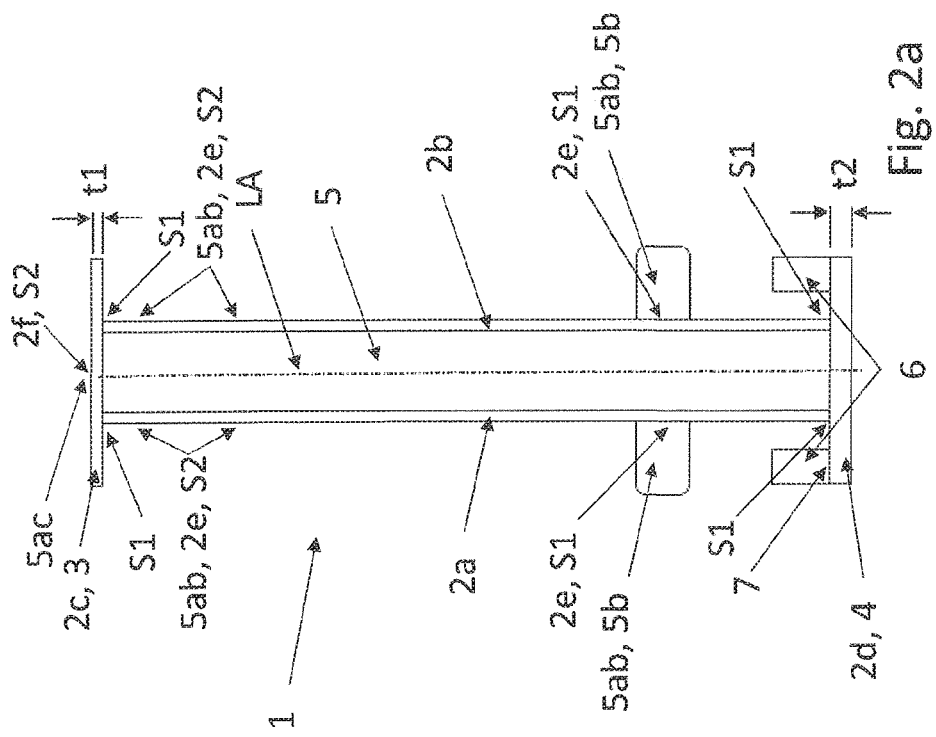

BOX GIRDER, IN PARTICULAR CRANE GIRDER, AND CRANE HEREWITH AS WELL AS MANUFACTURING METHOD THEREFOR

CROSS REFERENCE TO RELATED APPLICATION

The present application claims the priority benefits of International Patent Application No. PCT/EP2019/060012, filed Apr. 17, 2019, and claims benefit of Finnish patent application 20185367, filed on Apr. 18, 2018.

BACKGROUND AND FIELD OF THE INVENTION

The present invention relates to a box girder, in particular a crane girder, a crane herewith and a method of manufacturing the box girder.

Typically, a box girder has a box-shaped cross-sectional shape that encloses a hollow space. Cross-sectional refers to a section transverse to the longitudinal extension of the girder. The cross-sectional shape is usually determined by three or four plates welded together, so that a triangular cross-sectional shape of the hollow space is obtained from three plates and a quadrangular, especially rectangular or trapezoidal, cross-sectional shape of the hollow space is obtained from four plates.

In case of a rectangular cross-sectional shape of the hollow space the four plates are for example: one first chord plate extending in a horizontal plane and serving as an upper chord (upper chord plate), two side plates extending in parallel to each other and rectangular relative to the upper chord plate as well as a second chord plate extending in a horizontal plane below the upper chord plate and serving as a lower chord (lower chord plate). All plates also extend in parallel to the longitudinal extension of the box girder.

Such box girders of the so-called welded beam type are used in particular as main girders for cranes (crane girders), wherein the girder is configured to support a crane trolley having a lifting gear. The crane trolley is movable together with the lifting gear along the longitudinal extension of the girder. For this purpose a running surface for wheels of the crane trolley is provided on such girders, in particular on one of the at least one chord.

When manufacturing such a box girder, the adjacent chord plates and side plates must be welded together in pairs, for example by means of fillet welds. As described in the German Patent DE 100 36 366 C2, this requires precise positioning and alignment of the plates prior to the welding process. For the purpose of positioning the chord and side plates that are often several meters long, transverse plates are being used. Said transverse plates that may also be designated as transverse bulkheads or diaphragms extend transversely and at right-angles to the longitudinal extension of the box girder. The edges of the transverse plates are placed on the inner sides of the chord and side plates and welded to them. Usually a plurality of transverse plates are disposed spaced apart from each other along the longitudinal extension of the box girder. In particular, the transverse plates also serve to stiffen the box girder.

During the positioning and alignment, the plates are usually tack or spot welded prior to final welding by means of fillet welds. By being tack or spot welded, the plates are connected to each other spot-wise and superficially without producing elongated weld seams. In order to prepare the positioning and alignment as well as the tack/spot welding, marking of the positions for the transverse plates takes place, i.e. marking lines are being produced on the inner side surfaces of the chord and side plates. The marking can be done manually or automatically, e.g. during cutting of the plates. However, in any case the positioning and alignment, in particular the marking and tack/spot welding, are very time-consuming and costly as it takes up a considerable part of the production time for the whole box girder. Furthermore, during final welding, the plates are welded on the inner sides, whereby final weld seams cover the tack/spot welds. This may cause a reduction of the quality of the weld seams. In addition, the accessibility during welding on the inside of the box girder is often challenging within the hollow space of the box girder.

SUMMARY OF THE INVENTION

The present invention facilitates the manufacture of a box girder, in particular a crane girder and thus also the manufacture of a crane having such a crane girder.

According to an embodiment of the invention, a box girder, in particular a crane girder, may have two side plates spaced apart from each other, at least one chord plate connecting the two side plates to each other and at least one transverse plate that is arranged between the side plates connecting the side plates to each other and that serves as transverse bulkhead or diaphragm, wherein a welded joint is provided between the respective chord plate and the side plates. In particular, the weld seam(s) of the welded joint can be designed as fillet welds. In accordance with the invention it is suggested to improve and facilitate the manufacture of such a box girder in that at least one form-fitting connection, in particular plug-in connection, is provided between the transverse plate and each of the two side plates.

This makes it particularly easy to pre-assemble the respective plates of the box girder with regard to the final welding process that is used to produce the actual box girder. Preferably the plates are sheet metal plates having a flat shape and preferably without bent edges. In other words, the transverse plates extend within a plane that is defined by the thickness of the plate without extending beyond this plane due to the flat shape without bent edges. The alignment of the plates relative to each other during pre-assembly is determined by the highly accurate position of the form-fitting connection. The alignment and/or positioning of the plates is thus directly associated and goes along with the creation of the form-fitting connection(s). Thus, it is advantageously achieved in comparison with the above-described prior art that time-consuming marking of the plates for the desired alignment and corresponding positioning is not necessary anymore. Tools for this can also be omitted. In addition, auxiliary tack or spot welding is no longer necessary in order to keep the once-aligned plates in the desired position until the final welding process is completed.

Preferably, a plurality of transverse plates spaced apart from each other and each extending transversely and at right-angles to the longitudinal extension of the box girder are provided at predetermined positions and with high accuracy along the longitudinal extension of the box girder. The transverse plates that are used for one girder may differ from each other but may also be identical in design and are attached to both side plates in the same manner. The other details, which are generally described in the following example for the at least one transverse plate, are also preferably realized with several or all transverse plates of the box girder in case a plurality of transverse plates are provided.

For the production of the welded joint between the respective side plate and the respective chord plate, it may be sufficient that only the outer sides of the pairwise adjoining plates, i.e. an outer side of the respective side plate and an outer side of the respective chord plate, are welded together by means of a weld seam and thus connected. In case two chord plates are provided, i.e. one upper chord plate and one lower chord plate, the side plates are welded to both the upper chord plate and the lower chord plate correspondingly. Such a weld seam arrangement on the outside of the box girder, in particular on the outside of its chord and side plates, causes in an advantageous manner a good and manufacturing friendly accessibility of the regions to be welded, so that welding can be carried out in an automated manner, especially by means of robots. Furthermore, such a weld seam arrangement only on the outside of the box girder enables that the side plates can be arranged closer together, so that more space is available next to each side plate and above the laterally protruding chord plate, which space may be used for wheels of the crane trolley and other crane components that must be placed outside the hollow space of the box girder.

Another benefit from the form-fitting connection(s) is that the number of welding processes and weld seams within the box girder can be reduced or even eliminated, both during pre-assembly and final production/welding of the box girder. This applies in particular to previously required welded joints between the respective transverse plate and the inner sides of the side plates or chord plates.

Of course, in addition to the aforementioned weld seams on the outside of the box girder, further weld seams can also be provided. Basically, all adjoining plates can be welded together in this case, especially transverse plates with side plates and/or chord plates.

At least one chord plate is not only provided for the mechanical connection of the side plates, but in particular for the provision of a running surface for a crane trolley. A running surface can be provided directly if the chord plate itself forms the running surface, or indirectly if additional rails are attached to the respective chord plate. It is also possible to provide only one chord plate so that the enclosed hollow space of the box girder has a triangular cross section, where the side plates are diagonally aligned with respect to the horizontally extending upper or lower chord plate. If two chord plates are provided to form an upper chord and a lower chord, the box girder, in particular the hollow space enclosed by the box girder, has a cross section which is usually quadrangular and especially rectangular, with the chord plates extending horizontally and the side plates extending at right angles to it. However, the cross-section may also be trapezoidal.

In addition, provision may be made that at least one form-fitting connection, in particular plug-in connection, is also provided between the transverse plate and the chord plate. If two chord plates are provided in order to form one upper chord and one lower chord, it is possible that at least one form-fitting connection is provided between both chord plates and the respective transverse plate(s) or that at least one form-fitting connection is provided only between one of the two chord plates and the respective transverse plate(s). In order to improve the fatigue strength and resistance of plates of the girder, especially chord plates, that are subjected to tensile stress, the form-fitting connection between the corresponding plates to be welded can be dispensed with. This applies, for example, in the case of an underslung crane trolley application for the connection between the transverse plate and the lower chord plate, on which the crane trolley is then suspended in order to move along the longitudinal extension of the box girder on the lower chord or a running surface formed there.

In a structurally simple manner, provision may be made that for producing the respective form-fitting connection a plug-in portion of the transverse plate is received by a corresponding receiving aperture of the respective side plate and/or the respective chord plate, each receiving aperture having a substantially complementary shape relative to the respective plug-in portion, in particular relative to a cross-section of the plug-in portion. Thus, the respective receiving aperture of the chord plate or the side plate together with the plug-in portion simultaneously serves as a positioning aid and as a fixing aid in order to keep the respective plates in a form-fitting manner in the desired position for the final welding process. That is why the receiving apertures may also be designated as assembly slots or adjustment recesses and the plug-in portions may also be designated as assembly elements.

If more than one form-fitting connection is to be implemented between the transverse plate and the respective side plate or chord plate, more than one receiving aperture is provided for each side plate or chord plate. The transverse plate then has a correspondingly large number of corresponding plug-in portions.

Preferably, the receiving apertures are designed as through-holes, but can also be designed as blind holes. Receiving apertures that are designed as through-holes can be produced in a particularly advantageous manner, for example by means of processes such as punching or cutting, for example laser cutting. This is particularly advantageous if, for example, the outer contours of the plates are also produced using such a process, as the manufacture of the receiving apertures can then be appropriately integrated into the production of the entire plate.

For both through-holes and blind holes, the receiving aperture preferably has a long hole shape, in particular with parallel longitudinal sides and corresponding edges and with narrow sides which may form rounded ends and corresponding edges of the respective receiving aperture. This is preferably the case for each receiving aperture, although different configurations are also possible for each form-fitting connection, in particular also blind hole shaped receiving apertures. For example, the receiving aperture(s) for attaching the transverse plate to the side plate may differ from the receiving aperture(s) for attaching the transverse plate to the chord plate.

For through-holes, the respective plug-in portion is accessible from or on the outside of the respective plate. In this case, the respective plug-in portion can be inserted not only into but also through the corresponding receiving aperture so that it partially extends beyond the outside of the respective plate. As a result, the transverse plate protrudes at least partially, i.e. with the respective plug-in portion(s), transversely to the longitudinal extension of the box girder and from the interior hollow space of the box girder which is enclosed by the side plates and the chord plate(s). In this case, the above mentioned further weld seams connecting said transverse plate(s), in particular its plug-in portion(s), with the corresponding side plate may be of the fillet weld type. These weld seams would also be arranged on the outside of the box girder. Thus, the above-mentioned manufacturing friendly accessibility of the regions to be welded is also achieved so that welding can also be carried out in an automated manner, especially by means of robots.

Of course, it can also be provided for through-holes that the respective plug-in portion does not protrude through the corresponding receiving aperture, but only into the receiving aperture and at most to the outside of the corresponding plate. In this case, the above mentioned further weld seams connecting said transverse plate(s), in particular its plug-in portion(s), with the corresponding side plate may be of the plug weld type. The plug weld is then provided within the respective receiving aperture into which the corresponding plug-in portion protrudes, wherein the plug weld preferably connects the plug-in portion with the edge(s) of the receiving aperture. As the region of these plug welds would also accessible from the outside of the box girder, the above-mentioned manufacturing friendliness also applies regarding the plug welds so that welding can also be carried out in an automated manner, especially by means of robots.

In order to further facilitate the manufacture, provision may be made that the plug-in portion is formed as a protrusion of an outer edge of the transverse plate, in particular with respect to a rectangular main surface of the transverse plate with the protrusion having a rectangular shape. This applies preferably to each plug-in portion and, in particular, regardless of whether the corresponding receiving aperture is a blind hole or a through-hole. In other words, the plug-in portion formed by the protruding outer edge is an integral part of the transverse plate. The protrusion of the outer edge preferably also extends within the above-mentioned plane exclusively, which plane is defined by the thickness of the transverse plate. As a result, production of the plug-in portion can easily be accomplished during production of the transverse plate itself, e.g. during cutting of the outer contours and edges of the transverse plate.

Furthermore, it may be advantageously provided that at least one of the plug-in portions is designed to form a support element extending through the corresponding receiving aperture and being configured so that a crane equipment element, in particular a festoon/power supply line of drive motors of the crane and/or a profile, e.g. in the form of a U-tube, for receiving such a festoon/power supply line and/or a platform for personnel, is attachable to the support element. At least the corresponding receiving aperture for the respective supporting element is thus designed as a through-hole in the above sense, which is also preferred for the remaining receiving apertures, but not absolutely necessary. The respective plug-in portion forming the support element protrudes preferably further through the corresponding receiving aperture in the side plate than the possibly remaining regular plug-in portion(s) relative to the respective receiving aperture(s). The plug-in portion forming the support element may then be connected to the corresponding side plate by means of a welded joint, in particular by means of a fillet weld, or by means of taping, a glued or adhesive joint, a bolt connection or a combination of these. As mentioned above, it may also be provided that the remaining regular plug-in portion(s) not forming a support element, may protrude into the corresponding receiving aperture without extending beyond the outside of the respective plate. A welded joint of the plug weld type as described above may then be provided between the remaining plug-in portion(s) and the corresponding side plate. The above-mentioned advantages like the manufacturing friendly arrangement of the welding region and the associated possibility of automated welding apply here as well. The attachment of the respective crane equipment element may be produced by means of taping, another form-fitting connection, a glued or adhesive joint, or a combination of these. If, as mentioned above, several transverse plates are provided along the longitudinal extension of the box girder, this also applies to the support elements and corresponding receiving apertures, so that several support elements can be provided for the attachment of the respective crane components.

According to another aspect of the invention provision may be made that in addition to the form-fitting connection a further force-transmitting connection is provided between the transverse plate and the respective side plate and/or between the transverse plate and the respective chord plate, with the further force-fitting connection preferably being a welded joint, in particular of the fillet or the plug weld type. The above-mentioned advantages of such welded joints apply here accordingly. Instead of a welded joint the additional force-transmitting connection may also be a glued or adhesive joint or any other connection that can fulfill the binding and force transmitting requirement. In case of a material connection like a welded or glued or adhesive joint, the connection is preferably provided in the region of the plug-in portion and the corresponding receiving aperture so that the plug-in portion is connected to an edge of the respective receiving aperture.

An advantageous and, in particular, flexible use of the box girder results from the fact that it is configured so that each chord plate can alternatively form an upper chord in a first orientation of the box girder or a lower chord in a second orientation of the box girder, wherein, independently from the orientation of the box girder, a running surface for wheels of a crane trolley is provided on the same chord plate, in particular on opposite sides of the chord plate. As a result of this, the same box girder may be used to manufacture either a crane girder for a top running crane trolley application or an underslung crane trolley application.

To change the first orientation into the second orientation or vice versa, the box girder only has to be rotated by 180 degrees. The rotation can take place around the longitudinal axis of the box girder, for example. The respective chord plate extends horizontally in both orientations.

Also a crane having at least one box girder according to the invention and a lifting gear that is arranged on the box girder, in particular with the lifting gear being movable along the box girder and on its upper chord or lower chord by means of a crane trolley, leads to the above-mentioned advantages and can therefore be manufactured more easily than before. If the crane is designed as a double-girder crane, the crane comprises two corresponding box girders that are arranged in parallel to each other and spaced apart from each other. The features that are described regarding a single box girder and its manufacturing method apply accordingly to both box girders in case of a double-girder crane.

In accordance with the invention it is also suggested to improve and facilitate a manufacturing method for a box girder, in particular crane girder, having two side plates spaced apart from each other, at least one chord plate connecting the two side plates to each other and at least one transverse plate that is arranged between the side plates connecting the side plates to each other, wherein a welded joint is produced between the respective chord plate and the side plates. According to the invention such a manufacturing method may be improved in that at least one form-fitting connection, in particular plug-in connection, is produced between the transverse plate and each of the two side plates before the welded joint between the respective chord plate and the side plates is produced. In other words, the manufacturing method according to the invention may also be designated as a pre-assembly method for manufacturing a corresponding box girder. The above-mentioned advantages apply here as well, in particular with regard to a simplified production or a possible reduction of welded joints.

In addition, provision may be made that at least one form-fitting connection, in particular plug-in connection, is also produced between the transverse plate and the chord plate before the welded joint between the respective chord plate and the side plates is produced.

Provision may also advantageously be made that the respective form-fitting connection is produced by plugging, i.e. inserting, a plug-in portion of the transverse plate into a corresponding receiving-aperture of the respective side plate and/or the respective chord plate, each receiving aperture having a substantially complementary shape relative to the respective plug-in portion, in particular relative to a cross-section of the plug-in portion.

According to yet another step of the manufacturing method, provision may be made that in addition to the form-fitting connection and thus subsequent to producing the same, a further force-transmitting connection is produced between the transverse plate and the respective side plate and/or between the transverse plate and the respective chord plate, with the further force-transmitting connection preferably being a welded joint, in particular of the fillet or the plug weld type. The above-mentioned advantages of such welded joints apply here accordingly. Instead of a welded joint the additional force-transmitting connection may also be a glued or adhesive joint or any other connection that can fulfill the binding and force transmitting requirement. In case of a material connection like a welded or a glued or adhesive joint, the further force-transmitting connection is preferably provided in the region of the plug-in portion and the corresponding receiving aperture so that the plug-in portion is connected to an edge of the respective receiving aperture.

As described with regard to the box girder according to the invention, the installation of at least one of the above-mentioned support elements for the crane equipment elements to be installed outside the side plates can also be carried out as yet a further step of the manufacturing method before the above-mentioned welded joints between the side and chord plates or other force-fitting connections are made.

The aforementioned and further objects, advantages, purposes, and features of the present invention will become apparent upon review of the following specification in conjunction with the drawings.

BRIEF DESCRIPTION OF THE DRAWINGS

FIG. 1a shows a perspective view of a section of a box girder, in particular a crane girder, in accordance with an embodiment of the invention;

FIG. 1b shows a side view of the box girder of FIG. 1a;

FIG. 2a shows a front view of the box girder of FIGS. 1a and 1b in a first orientation and as seen in the direction of the longitudinal extension of the girder;

FIG. 2b shows a front view of the box girder of FIGS. 1a and 1b in a second orientation and as seen in the direction of the longitudinal extension of the girder;

DESCRIPTION OF THE PREFERRED EMBODIMENTS

FIG. 1a shows a perspective view of a section of a box girder 1 that is configured to be used as a crane girder, e.g. for a single-girder crane or a double-girder crane. If a crane is designed as a double-girder crane, the crane does not only comprise one single box girder 1 but two corresponding box girders 1 according to the invention that are then arranged in parallel to each other. The features that are described regarding the box girder 1 apply accordingly to both girders in case of a double-girder crane.

Figure 4:
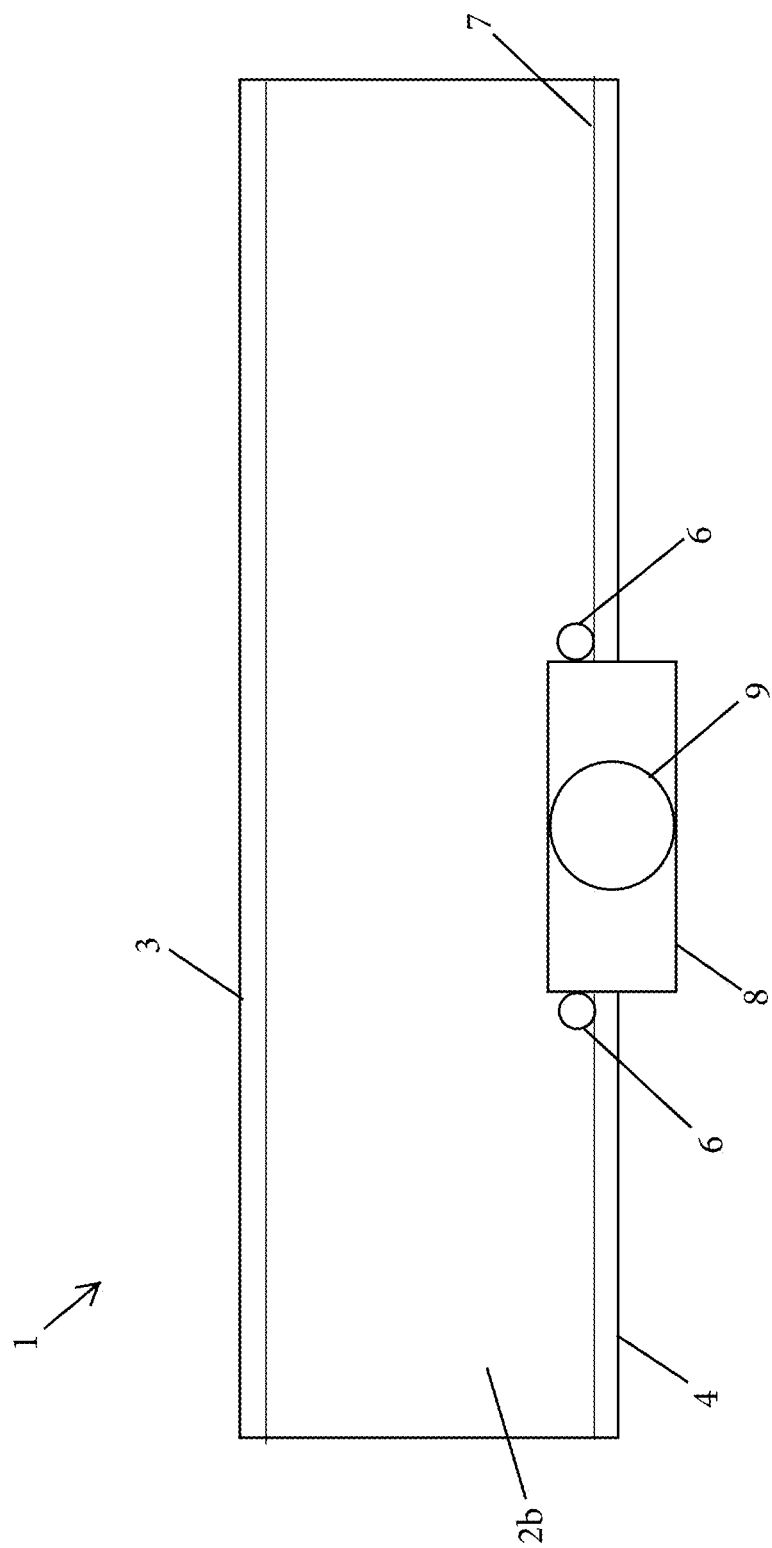
FIG. 4 is a side elevation view of a crane girder supporting a moveable crane trolley in accordance with an embodiment of the invention.

The girder 1 is oriented horizontally with its longitudinal extension L. When used as a crane girder, the girder 1 is configured to support a crane trolley 8 having a lifting gear 9, e.g. a cable winch or a chain hoist. The crane trolley 8, in particular its traveling mechanism and the lifting gear, is motorized, e.g. by means of at least one electric drive motor. The motorized crane trolley 8 is thus movable together with the lifting gear 9 along the longitudinal extension L of the girder. For this purpose a running surface 7 for wheels 6 (see FIGS. 2a and 2b, and FIG. 4) of the crane trolley 8 is provided on the girder 1. Furthermore, provision may be made that traveling mechanisms, not illustrated, are fastened to opposite ends of the girder 1, so that a crane bridge is formed. By means of the traveling mechanisms of the girder 1, the girder 1 is movable on rails, not illustrated, in a horizontal direction of travel transversely and at right angles with respect to the longitudinal extension L of the girder 1. The rails are typically arranged at a position above the ground and for this purpose can be elevated, for example, by means of a suitable support structure or can be fastened to opposite walls of a building. In order to move the girder 1, the traveling mechanisms of the girder 1 are each driven by a drive motor, in particular by an electric motor. By means of a crane control horizontal movements of the girder 1 and/or the crane trolley 8 together with the lifting gear 9 and vertical movements of the lifting gear 9 can be controlled and operated separately from one another in order to pick up and move loads between different places and in three-dimensional moving directions.

In case of a so-called top running crane trolley application the running surface 7 for the crane trolley may be provided on top of the girder 1, especially on its upper chord 3 that may also be designated as a top flange or by a rail 1a arranged on the upper chord 3 (see FIG. 2b). In case of a so-called underslung application, where the crane trolley 8 is suspended from the girder 1, the running surface 7 is provided on a lower chord 4 of the girder 1 (see FIGS. 2a and 4). The lower chord 4 may also be designated as a bottom flange. For this purpose, in FIG. 2a the chord plate 2d forms the lower chord 4 and protrudes horizontally and laterally from the two side plates 2a, 2b in a transverse direction with respect to and along the longitudinal extension L of the girder 1. The running surface 7 is thus divided by the two side plates 2a, 2b. In view of FIGS. 2a and 2b it becomes evident that the girder 1 is configured so that each chord plate 2c, 2d can alternatively form the upper chord 3 in a first orientation of the box girder 1 or the lower chord 4 in a second orientation of the box girder 1. As a result, independently from the orientation of the box girder 1, the running surface 7 for wheels 6 of a crane trolley is provided on the same chord plate 2d. It is also indicated in FIGS. 2a and 2b that the thickness t2 of the chord plate 2d is greater than the thickness t1 of the chord plate 2c, owed to the fact that the chord plate 2d is providing the running surface 7 for both the top running crane trolley application and the underslung application.

The box girder 1 shown in FIG. 1a has a box-shaped cross-sectional shape in the above-defined sense that is determined by four sheet metal plates 2a, 2b, 2c, 2d welded together, so that a hollow space is enclosed. In the present case a quadrangular cross-sectional shape of the hollow space is obtained from the arrangement of the four plates 2a-2d that all have a flat shape. In particular the girder 1 comprises a first side plate 2a, a second side plate 2b, a first chord plate 2c and a second chord plate 2d. Both side plates 2a, 2b may also be designated as web plates. The side plates 2a, 2b are horizontally spaced apart from each other and form vertical side walls of the girder 1. The upper chord 3 is formed by the horizontally orientated first chord plate 2c and the lower chord 4 is formed by the horizontally orientated second chord plate 2d.

Both chord plates 2c, 2d are connecting the two side plates 2a, 2b to each other so that the hollow space is enclosed. Furthermore, a welded joint is provided between outer sides of the respective chord plate 2c, 2d and the side plates 2a, 2b, wherein each side plate 2a, 2b is connected to each chord plate 2c, 2d on the respective outer side and by means of a weld seam S1 of the fillet weld type (see also FIG. 2a and FIG. 2b), so that the plates 2a-2d are welded together in pairs. Thus, the girder 1 can also be designated as a welded beam.

Figure 1B:
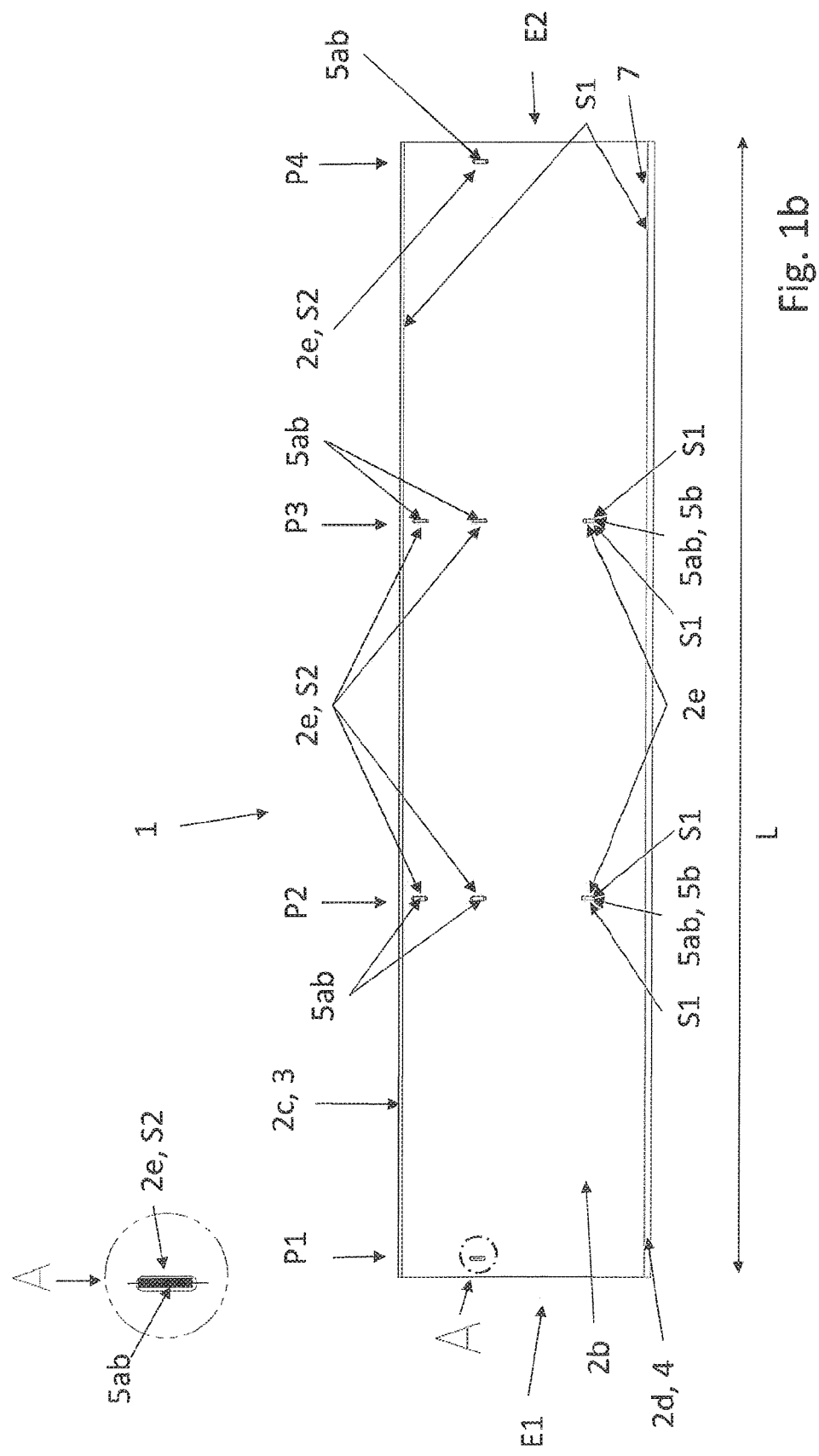

It is also indicated in FIGS. 1a and 1b that an exemplary number of four transverse plates 5 are arranged between the side plates 2a, 2b connecting the side plates 2a, 2b to each other while each transverse plate 5 extends transversely and at rights angles to the longitudinal extension L of the girder 1. In the side view of FIG. 1b the first side plate 2a is hidden behind the shown second side plate 2b and the receiving apertures 2f and corresponding plug-in portions 5ab that can be seen in FIG. 1a are hidden by the chord plate 2c. The transverse plates 5 are spaced apart from each other at positions P1, P2, P3, P4 along the longitudinal extension L and serve as transverse bulkheads or diaphragms. In FIG. 1a a first outer transverse plate 5 and the inner transverse plates 5 are exemplified with dashed lines at positions P1, P2 and P3.

A form-fitting connection, in particular a plug-in connection, is provided between each transverse plate 5 and the side plates 2a, 2b, respectively. Further, a form-fitting connection, in particular a plug-in connection, is also provided between each transverse plate 5 and the first chord plate 2c. The form-fitting connections are produced during pre-assembly of the girder 1 and prior to welding the plates 2a, 2b, 2c and 5 together as described below. The positions P1, P2, P3, P4 of the transverse plate 5 with respect to the longitudinal extension L and seen from a first end E1 of the girder 1 are determined by respective receiving apertures 2e, 2f that serve as assembly slots (see also FIG. 1b). For this purpose, the receiving apertures 2e, 2f are designed as through-holes and are provided in the plates 2a, 2b, 2c along the longitudinal extension L. As a result, implementation of the corresponding form-fitting connection is possible by plugging a plug-in portion 5ab, 5ac of the transverse plate 5 into the respective receiving aperture 2e or 2f. All receiving apertures 2e, 2f that define one of the positions P1, P2, P3 or P4 for the corresponding transverse plate 5 are arranged within an imaginary plane at the respective position P1, P2, P3 or P4 with the plane extending transversely and at rights angles to the longitudinal extension L. In the present example there is one lateral receiving aperture 2e in each side plate 2a, 2b and one receiving aperture 2f in the first chord plate 2c at positions P1 and P4. At positions P2 and P3 there are three lateral receiving apertures 2e in each side plate 2a, 2b and also one receiving aperture 2f in the first chord plate 2c.

Of course, the number of receiving apertures 2e, 2f in each plate 2a, 2b, 2c and per position P1, P2, P3, P4 as well as the number of the corresponding plug-in portions 5ab, 5ac may vary. However, at least one lateral receiving aperture 2e in each side plate 2a, 2b and optionally at least one receiving aperture 2f in one of the chord plates 2c, 2d and corresponding plug-in portions 5ab, 5ac are preferred at each position P1, P2, P3, P4.

Figure 3B:
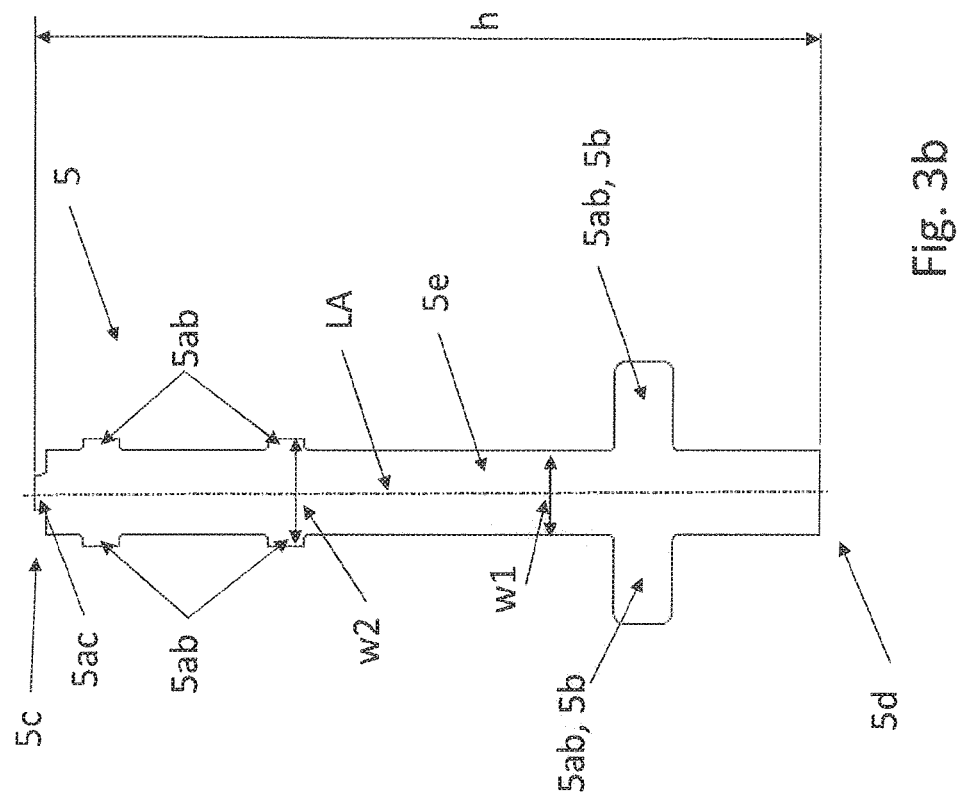
FIG. 3b shows a plan view of a second embodiment of a transverse plate of the box girder of FIGS. 1a, 1b, 2a and 2b.
Figure 3A:
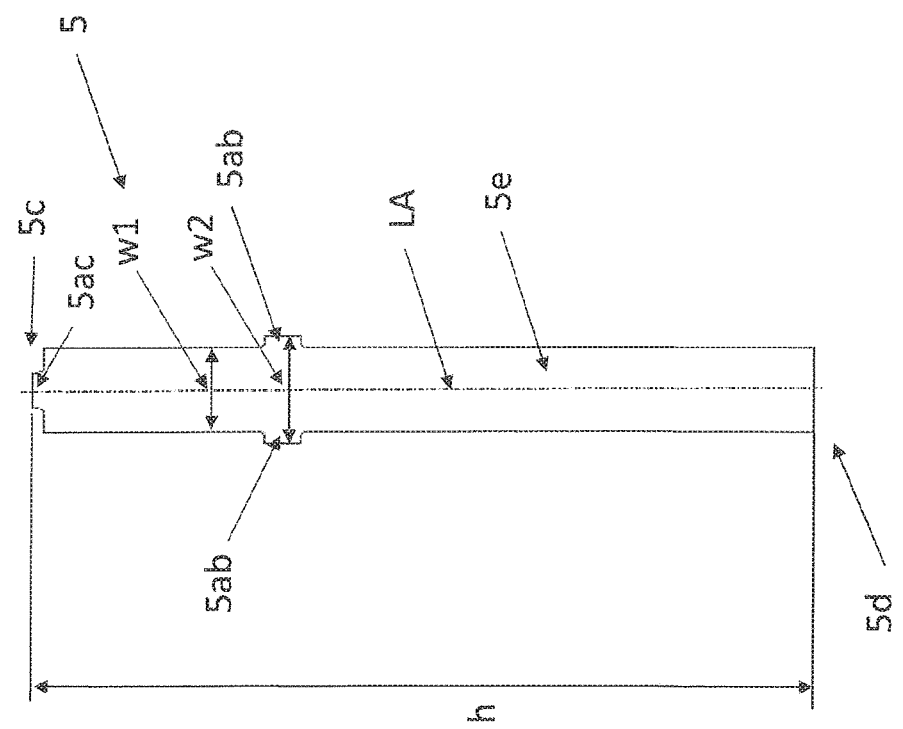
FIG. 3a shows a plan view of a first embodiment of a transverse plate of the box girder of FIGS. 1a, 1b, 2a and 2b.

Furthermore, it is indicated in FIG. 1a and FIG. 1b that two different embodiments of the transverse plates 5 are used in the illustrated example. Starting from the first end E1 of the girder 1, the first outer transverse plate 5 according to a first embodiment is provided at the first position P1 close to the first end E1 with respect to the longitudinal extension L. Such a transverse plate 5 according to the first embodiment is exemplified in FIG. 1a with dashed lines and is also shown in FIG. 3a and described in detail below.

Further apart from the first end E1 and from the first transverse plate 5 two further transverse plates 5, each according to a second embodiment, are exemplified in FIG. 1a with dashed lines at positions P2 and P3, respectively. As can be seen in FIG. 1a, the transverse plates 5 according to the second embodiment have two opposing plug-in portions 5ab that are designed to form support elements 5b extending through the corresponding receiving apertures 2e of the opposite side plates 2a, 2b. The support elements 5b are configured so that a crane equipment element like a profile 1b in the form of a U-tube for receiving a power supply line for the above-mentioned drive-motors of the crane can be attached to the support element 5b outside the hollow space of the girder 1 and next to the corresponding side plate 2a or 2b as shown in FIG. 1a. Alternatively, the attachable crane equipment element may also be a platform for personnel. In the present example the support element 5b and corresponding receiving apertures 2e are those of the three plug-in portions 5ab and receiving apertures 2e that are situated closest to the chord plate 2d. However, as can be seen in FIGS. 1a and 2a, there is still enough space for the wheels 6 between the support elements 5b and the running surface 7 in case of the illustrated underslung application. A corresponding transverse plate 5 according to the second embodiment is also shown in FIG. 3b and described in detail below.

In the region of the second end E2 (see FIG. 1b) of the girder 1 which is opposing the first end E1 another transverse plate 5 according to the first embodiment is provided at position P4. Thus, the two outer transverse plates 5 that are arranged close to the ends E1, E2, respectively, are designed according to the first embodiment. The inner transverse plates 5 that are arranged between the aforementioned outer transverse plates 5 are designed according to the second embodiment.

Of course, the number of transverse plates 5 may vary and there may be more than two inner transverse plates 5 or only one inner transverse plate 5, depending on the desired length of the girder 1. Moreover, other arrangements and combinations of the two embodiments of transverse plates 5 are possible and it is also possible to use only identical transverse plates 5 according to the same embodiment, for example only transverse plates 5 that each have at least one support element 5b according to the second embodiment or only transverse plates 5 where no support elements 5b are formed. The latter may the case if no profile 1b or any other crane equipment element needs to be attached to the girder 1.

The receiving apertures 2e, 2f that are provided in the plates 2a, 2b, 2c for producing the respective form-fitting connection with the corresponding plug-in portion 5ab, 5ac of the transverse plates 5 have a substantially complementary shape relative to the cross-section of the respective plug-in portion 5ab, 5ac. As can be seen from FIG. 1a, 1b and especially from detail A in FIG. 1b, the lateral receiving apertures 2e may have a long hole shape with parallel longitudinal sides and corresponding edges and narrow sides which forms rounded ends and corresponding edges of the respective receiving aperture 2e. The same applies to the shape of the receiving apertures 2f of the chord plate 2c. The distance of the longitudinal sides of the receiving apertures 2e, 2f is slightly wider than the thickness of the transverse plates 5 and its plug-in portions 5ab, 5ac so that insertion of the plug-in portions 5ab, 5ac into and/or through the receiving apertures 2e, 2f is allowed. Furthermore, the longitudinal sides of the apertures 2e, 2f are in parallel with respect to the above-mentioned imaginary plane, in particular defining the corresponding imaginary plane at the respective positions P1, P2, P3, P4.

In connection with the above-mentioned features it is thus within the scope of the present invention to provide a pre-assembly method for manufacturing the above-described girder 1. A main aspect of the pre-assembly method is that at least one form-fitting connection, in particular plug-in connection, is produced between the respective transverse plate 5 and the two opposing side plates 2a, 2b, respectively, before the welded joint between the respective chord plate 2c, 2d and the side plates 2a, 2b is produced. In addition to this, at least one form-fitting connection, in particular plug-in connection, may also be produced between the transverse plate 5 and one of the chord plates 2c, 2d before the welded joint between the respective chord plate 2c, 2d and the side plates 2a, 2b is produced. In the present example only the first chord plate 2c is connected to the transverse plates 5 by means of such a form-fitting connection. In contrast, a form-fitting plug-in connection according to the invention is dispensed with between the second chord plate 2d and the transverse plates 5, in order to improve the fatigue strength and resistance of the plate 2d.

Producing the form-fitting connection(s), in particular plug-in connection(s), is enabled due to the specific and accurate provision of the plug-in portion(s) 5ab, 5ac on the transverse plate(s) 5 and the corresponding receiving aperture(s) 2e, 2f in the plates 2a, 2b, 2c. As a result of these structural features, producing of the form-fitting connection(s) between the plates 2a, 2b, 2c and 5 goes along with aligning them in their final positions for the completed girder 1. Thus, it is achieved that the final positions are maintained until the final welding process is completed only by means of the form-fitting connections so that an easy pre-assembly prior to the final welding process is possible. This applies to all modifications of the girder 1 according to the invention, regardless of the number of transverse plates 5, plug-in portions 5ab, 5ac and corresponding receiving apertures 2e, 2f.

Subsequent to producing the above-described form-fitting connection(s), a further force-transmitting connection is produced between the transverse plates 5 and the respective side plates 2a, 2b and/or between the transverse plates 5 and the respective chord plate 2c. In the present example the further force-fitting connection is a welded joint, in particular comprising weld seams S1 of the fillet weld type and weld seams S2 of the plug weld type. The positions of these weld seams S1, S2 are schematically illustrated in FIGS. 1a, 1b, 2a and 2b. It is also indicated in FIGS. 1a, 2a and 2b that the regular plug-in portions 5ab, 5ac not forming support elements 5b do not protrude through the corresponding receiving apertures 2e, 2f, but only into the receiving aperture 2e, 2f. In FIGS. 2a and 2b the positions of the hidden regular plug-in portions 5ab, 5ac and the corresponding receiving apertures 2e, 2f are indicated. In these cases the plug-in portions 5ab, 5ac are welded to the corresponding plate 2a, 2b, 2c by means of weld seams S2 of the plug weld type. In contrast, the plug-in portions 5ab forming support elements 5b protrude through the corresponding receiving apertures 2e and beyond the outside of the respective plate and thus to the outside of the girder 1 and its hollow space. In these cases the plug-in portions 5ab, i.e. the support elements 5b, are welded to the corresponding plates 2a, 2b by means of weld seams S1 of the fillet weld type. All weld seams S1, S2 connect the corresponding plug-in portion 5ab, 5ac to an edge of the respective receiving aperture 2e, 2f. As indicated in FIG. 1b, there can be provided two weld seams S1 on the opposing sides of each support element 5b so that the support element 5b is welded to both opposing longitudinal sides/edges of the corresponding receiving aperture 2e.

FIG. 3a, 3b show plan views of the two embodiments of the transverse plate 5. The transverse plates 5 according to both embodiments are formed symmetrically in relation to their respective longitudinal axis LA. As a result, identically designed side plates 2a, 2b can be used so that the lateral receiving apertures 2e are mutually opposing at each position P1, P2, P3, P4 as it is indicated in FIGS. 2a and 2b. Furthermore, the transverse plates 5 according to both embodiments comprise an elongate shape in the direction of the longitudinal axis LA and have a rectangular and planar main surface 5e. The plug-in portions 5ab, 5ac are each formed as a protrusion of an outer edge of the transverse plate 5 with respect to the main surface 5e. In other words, the outer edge is protruding from the rectangular shape of the main surface 5e in order to form the respective plug-in portion 5ab for the side plates 2a, 2b or the plug-in portion 5ac for the chord plate 2c. In the present embodiments all plug-in portions 5ab, 5ac have a rectangular shape, however other shapes are of course possible.

In order to form the plug-in portions 5ab for the side plates 2a, 2c and thus also the support elements 5b, the longitudinal edges of the transverse plates 5 extending in parallel to the longitudinal axis LA are offset away from the longitudinal axis LA in comparison with the remaining longitudinal edges defining the main surface 5e. Thus, the longitudinal edges of the plug-in portions 5ab have a greater distance from the longitudinal axis LA than the longitudinal edges of the main surface 5e outside the plug-in portions 5ab. The offset of the longitudinal edges of the plug-in portions 5ab with regard to the longitudinal edges of the main surface 5e is dimensioned so that the plug-in portions 5ab protrude through the lateral receiving apertures 2e only for those plug-in portions 5ab that are designed to form support elements 5b. Thus, the support elements 5b extend further transversely to the longitudinal axis LA than the regular plug-in portions 5ab. Accordingly, the offset of the remaining regular plug-in portions 5ab not forming support elements 5b is smaller so that the plug-in portions 5ab do not protrude beyond the outside of the side plates 2a, 2b. Thus, the maximum offset of the regular plug-in portions 5ab depends on the thickness of the side plates 2a, 2b. The same applies to the dimension of the offset of the regular plug-in portions 5ac for the chord plate 2c. In contrast to the plug-in portions 5ab, the plug-in portion 5ac is formed at the first end 5c of the transverse plates 5. For this purpose, the edge of the corresponding narrow side of the transverse plates 5 is offset away from the remaining edge defining the main surface 5e at the narrow side. The maximum offset of the plug-in portion 5ac depends on the thickness of the chord plate 2c.

It can also be seen from FIGS. 3a and 3b that the transverse plates 5 of both embodiments differ from each other in that the transverse plate 5 in FIG. 3a has only two opposing regular plug-in portions 5ab but no plug-in portion 5ab that is designed to form a support element 5b, whereas the transverse plate 5 in FIG. 3b has two opposing plug-in portions 5ab forming support elements 5b and two further pairs of opposing regular plug-in portions 5ab. Besides these differences, the height h, the width w1 and the width w2 of both embodiments are the same.

The invention claimed is:

1. A crane girder and trolley for a crane comprising:
a crane girder comprising;
   two side plates spaced apart from each other;
   at least one chord plate connecting the two side plates to each other, wherein the at least one chord plate defines a horizontally extending plane;
   at least one transverse plate that is arranged between the side plates and that connects the side plates to each other; and
   a welded joint connecting the respective chord plate and the side plates;
   wherein at least one form-fitting connection comprising a plug-in connection is disposed at the transverse plate and each of the two side plates, and wherein at least one form-fitting connection comprising a plug-in connection is disposed at the transverse plate and the chord plate;
a crane trolley supported on the crane girder, wherein the crane trolley is configured for movement along the crane girder.

2. The crane girder and trolley as claimed in claim 1, wherein each respective form-fitting connection comprises a plug-in portion of the transverse plate that is received by a corresponding receiving aperture of the respective side plate and the respective chord plate, with each receiving aperture having a substantially complementary shape relative to the respective plug-in portion.

3. The crane girder and trolley as claimed in claim 2, wherein each plug-in portion is formed as a protrusion of an outer edge of the transverse plate, and wherein the protrusion has a rectangular shape.

4. The crane girder and trolley as claimed in claim 3, wherein at least one of the plug-in portions is designed to form a support element extending through the corresponding receiving aperture, with the support element being configured to attachably receive a crane equipment element comprising a power supply line and/or a platform for personnel.

5. The crane girder and trolley as claimed in claim 4, further comprising a force-transmitting connection comprising a further welded joint provided between the transverse plate and the respective side plate and/or between the transverse plate and the respective chord plate, wherein the further welded joint comprises a fillet or a plug weld type.

6. The crane girder and trolley as claimed in claim 5, wherein the at least one chord plate comprises two chord plates, and wherein each chord plate can alternatively form an upper chord in a first orientation of the box girder or a lower chord in a second orientation of the box girder, and wherein, independently from the orientation of the box girder, a running surface for wheels of the crane trolley is provided on the same chord plate.

7. The crane girder and trolley as claimed in claim 2, wherein each plug-in portion is formed as a protrusion of an outer edge of the transverse plate.

8. The crane girder and trolley as claimed in claim 7, wherein each protrusion has a rectangular shape.

9. The crane girder and trolley as claimed in claim 2, wherein at least one of the plug-in portions is designed to form a support element extending through the corresponding receiving aperture, with the support element configured to attachably receive a crane component.

10. The crane girder and trolley as claimed in claim 1, further comprising a force-transmitting connection comprising another welded joint provided between the transverse plate and the respective side plate and/or between the transverse plate and the respective chord plate.

11. The crane girder and trolley as claimed in claim 1, wherein the at least one chord plate comprises two chord plates with one chord plate disposed at one end of the side plates and the other chord plate disposed at an opposite end of the side plates.

12. The crane girder and trolley as claimed in claim 11, wherein each chord plate can alternatively form an upper chord in a first orientation of the box girder or a lower chord in a second orientation of the box girder, and wherein, independently from the orientation of the box girder, a running surface for wheels of the crane trolley is provided on the same chord plate.

13. A crane having a crane girder and a crane trolley supporting a lifting gear that is arranged on the crane girder, wherein the crane comprises:
   two side plates spaced apart from each other;
   two chord plates comprising an upper chord and a lower chord connecting the two side plates to each other, wherein the upper chord and lower chord define horizontally extending planes; at least one transverse plate that is arranged between the side plates and that connects the side plates to each other; and
   a welded joint connecting the respective chord plate and the side plates;
   wherein at least one form-fitting connection comprising a plug-in connection is disposed at the transverse plate and each of the two side plates, and wherein at least one form-fitting connection comprising a plug-in connection is disposed at the transverse plate and at least one of the two chord plates, and wherein a lifting gear is movable along the crane girder on its upper chord or lower chord by a crane trolley.

14. The crane as claimed in claim 13, wherein each respective form-fitting connection comprises a plug-in portion of the transverse plate that is received by a corresponding receiving aperture of the respective side plate and the respective chord plate, with each receiving aperture having a substantially complementary shape relative to the respective plug-in portion.

15. The crane as claimed in claim 13, wherein each plug-in portion is formed as a protrusion of an outer edge of the transverse plate.

16. The crane as claimed in claim 13, wherein at least one of the plug-in portions is designed to form a support element extending through the corresponding receiving aperture, with the support element configured to attachably receive a crane component.

17. The crane as claimed in claim 13, further comprising a force-transmitting connection comprising another welded joint provided between the transverse plate and the respective side plate and/or between the transverse plate and the respective chord plate.

18. A method of producing a crane girder, said method comprising:
   spacing two side plates apart from each other;
   arranging at least one transverse plate between the side plates; and connecting the two side plates to each other with the at least one transverse plate and with at least one chord plate, wherein the at least one chord plate defines a plane that extends horizontally when connected thereto and wherein said connecting the two side plates to each other includes at least one form-fitting connection comprising a plug-in connection disposed at the transverse plate and each of the two side plates, and includes at least one form-fitting connection comprising a plug-in connection disposed at the transverse plate and the chord plate;

welding a joint between the respective chord plate and the side plates after said connecting the two side plates to each other; and supporting a crane trolley for movement on one of the at least one chord plates.

19. The method of producing a crane girder as claimed in claim 18, wherein each respective form-fitting connection is produced by plugging a plug-in portion of the transverse plate into a corresponding receiving-aperture of the respective side plate and the respective chord plate, each receiving aperture having a substantially complementary shape relative to the respective plug-in portion.

20. The method of producing a crane girder as claimed in claim 18, further comprising welding a force-transmitting connection comprising a further welded joint between the transverse plate and the respective side plate and/or between the transverse plate and the respective chord plate, wherein the further welded joint comprises a fillet or a plug weld type.

* * * * *